United States Patent
Wang et al.

(10) Patent No.: US 9,690,164 B2
(45) Date of Patent: Jun. 27, 2017

(54) ACOUSTO-OPTIC CRYSTAL OPTICAL WAVEGUIDE AND ACOUSTIC WAVE SENSOR HAVING THE SAME

(71) Applicant: NATIONAL SUN YAT-SEN UNIVERSITY, Kaohsiung (TW)

(72) Inventors: Jau-Sheng Wang, Kaohsiung (TW); Yung-Hsin Tseng, Kaohsiung (TW)

(73) Assignee: NATIONAL SUN YAT-SEN UNIVERSITY, Kaohsiung (TW)

( * ) Notice: Subject to any disclaimer, the term of this patent is extended or adjusted under 35 U.S.C. 154(b) by 308 days.

(21) Appl. No.: 14/702,923

(22) Filed: May 4, 2015

(65) Prior Publication Data
US 2016/0259226 A1 Sep. 8, 2016

(30) Foreign Application Priority Data
Mar. 2, 2015 (TW) .............................. 104106560 A

(51) Int. Cl.
*G01H 9/00* (2006.01)
*G02F 1/00* (2006.01)
*G02F 1/335* (2006.01)

(52) U.S. Cl.
CPC ............. *G02F 1/335* (2013.01); *G01H 9/004* (2013.01); *G02F 1/0072* (2013.01)

(58) Field of Classification Search
CPC ........ G02F 1/335; G02F 1/0072; G01H 9/004
USPC .......................................................... 73/655
See application file for complete search history.

(56) References Cited

U.S. PATENT DOCUMENTS

| | | | | |
|---|---|---|---|---|
| 4,422,167 A * | 12/1983 | Shajenko | ................. | G01H 9/00 367/149 |
| 4,789,241 A * | 12/1988 | Michal | ................. | G01C 19/726 356/464 |
| 6,041,020 A * | 3/2000 | Caron | .................... | G01H 9/008 356/340 |
| 8,718,414 B2 | 5/2014 | Gugel et al. | | |
| 2010/0134867 A1* | 6/2010 | Gugel | ................ | G02B 21/0064 359/287 |

FOREIGN PATENT DOCUMENTS

TW                412655           11/2000

OTHER PUBLICATIONS

Taiwanese Office Action mailed Dec. 1, 2015 for Taiwanese Patent Application No. 104106560, 5 pages.

\* cited by examiner

*Primary Examiner* — J M Saint Surin
(74) *Attorney, Agent, or Firm* — Jackson IPG PLLC; Demian K. Jackson

(57) ABSTRACT

An acousto-optic crystal optical waveguide is applicable to an acoustic wave sensor for sensing acoustic wave, wherein the acousto-optic crystal optical waveguide includes an acousto-optic crystal core and an inner cladding layer covering the acousto-optic crystal core. The acoustic wave is able to change the refraction index of the acousto-optical crystal optical waveguide to make a light beam with specific wavelength refracting to outside of the acousto-optic crystal waveguide when a light beam transmits through the acousto-optic crystal optical waveguide. Objective of acoustic wave sensing is achieved by detecting wavelength and intensity variation of the light beam transmits through the acousto-optic crystal optical waveguide.

29 Claims, 8 Drawing Sheets

ACOUSTO-OPTIC CRYSTAL OPTICAL WAVEGUIDE AND ACOUSTIC WAVE SENSOR HAVING THE SAME

FIELD OF THE INVENTION

The present invention relates to a crystal optical waveguide and an acoustic wave sensor with the crystal optical waveguide, particularly relates to an acousto-optic crystal optical waveguide that performs acoustic wave sensing by acousto-optic effect and an acoustic wave sensor with the acousto-optic crystal optical waveguide.

BACKGROUND OF THE INVENTION

Conventional acoustic wave sensor performs acoustic wave sensing by PZT (piezoelectric). Electric charge transfer in PZT makes partial electric charges distributing non-uniformly to generate electric potential difference when acoustic wave causes deformation of PZT. PZT acoustic wave sensor performs acoustic wave sensing by electric potential difference. However, PZT acoustic wave sensor merely detects small range of acoustic wave frequency (approximately 140 kHz), and the direction of acoustic wave is constrained as well.

SUMMARY

The primary objective of the present invention is to provide an acousto-optic crystal optical waveguide and an acoustic wave sensor with the acousto-optic crystal optical waveguide. The acousto-optic crystal optical waveguide includes an acousto-optic crystal core and an inner cladding layer wherein the inner cladding layer covers the acousto-optic crystal core and the refraction index of the inner cladding layer is different from that of the acousto-optic crystal core. The acousto-optic crystal optical waveguide applies to the acoustic wave sensor for sensing acoustic wave by the variation of a light beam transmitting through the acousto-optic crystal optical waveguide.

The acousto-optic crystal core comprises an input terminal and an output terminal, wherein the light beam inputs into the input terminal and outputs from the output terminal, and transmits through the acousto-optic crystal core in waveguide propagation modes. The acousto-optic crystal density of the acousto-optic crystal core produces periodic change to make the refraction index of the acousto-optic crystal core produce periodic change to form a grating that makes a light beam with specific wavelength unable to transmit through the acousto-optic crystal core in waveguide propagation modes and refract to outside of the acousto-optic crystal optical waveguide from the acousto-optic crystal core to change spectrum of the light beam transmitting through the acousto-optic crystal core when the acousto-optic crystal core is affected by a continuous acoustic wave with specific frequency.

The acousto-optic crystal optical waveguide of the present invention applied to an acoustic wave sensor which uses the inner cladding layer covering the acousto-optic crystal core and controlling the collapsing level between the acousto-optic crystal core and the inner cladding layer to form the acousto-optic crystal core with different diameters, or uses the inner cladding layer with different refraction index to control transmission mode number of acousto-optic crystal optical waveguide. A light beam with specific wavelength refracts to outside of the acousto-optic crystal optical waveguide varies the intensity of the light beam transmit through the acousto-optic crystal optical waveguide when the refraction index of the acousto-optic crystal core produce periodic change to form a grating by the continuous acoustic wave with specific frequency. Owing to the acoustic wave with specific frequency vary the light beam intensity in specific wavelength, thus, the objective of acoustic wave sensing can be achieved by sensing spectrum variance of the light beam transmitting through the acousto-optic crystal optical waveguide. The acoustic wave sensor with acousto-optic crystal optical waveguide is more sensitive to the acoustic angle when the transmission mode number of the acousto-optic crystal optical waveguide is lower. Conversely, the acoustic wave sensor with acousto-optic crystal optical waveguide is more sensitive to the acoustic frequency when the transmission mode number of the acousto-optic crystal optical waveguide is higher. The acousto-optic crystal optical waveguide of the present invention is able to enhance the frequency detection range and sensitivity of the acoustic wave sensor, and further controls the sensitivity to acoustic frequency or direction of the acoustic wave sensor by adjusting the transmission mode number of the acousto-optic crystal optical waveguide.

DETAILED DESCRIPTION OF THE INVENTION

Figure 1:
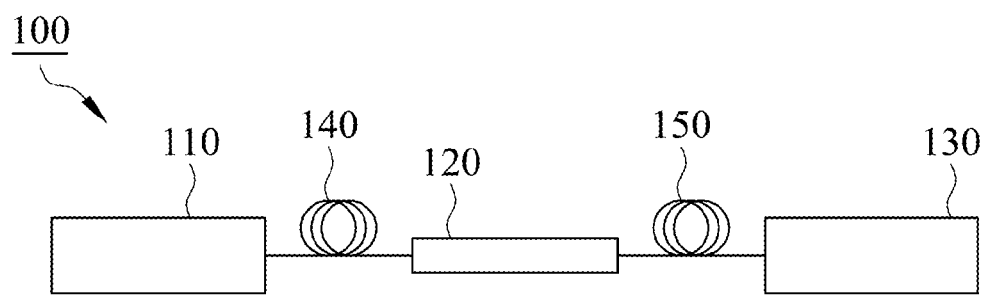
FIG. 1 is a diagram illustrating an acoustic wave sensor with acousto-optic crystal optical waveguide in accordance with first embodiment of the present invention.
Figure 2:
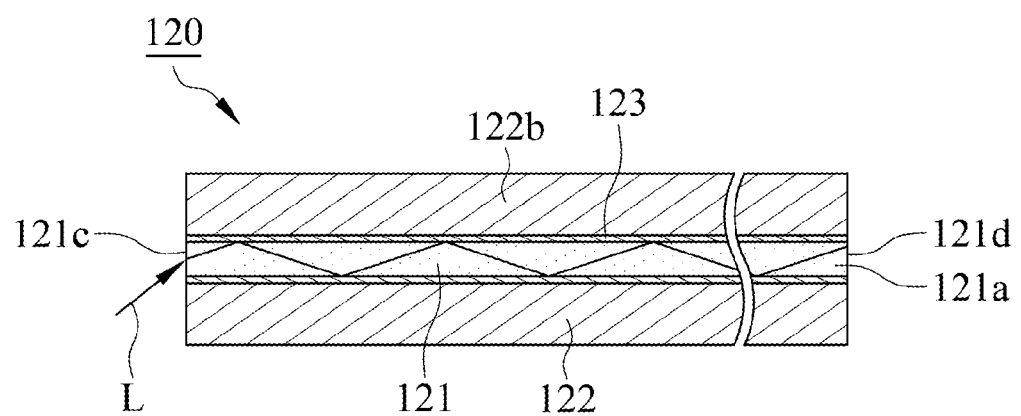
FIG. 2 is a diagram illustrating an acousto-optic crystal optical waveguide in accordance with the present invention.

With reference to FIGS. 1 and 2, an acoustic wave sensor with acousto-optic crystal optical waveguide 100 disclosed in accordance with first embodiment of the present invention includes a light source 110, a acousto-optic crystal optical waveguide 120 and a photo detector 130. The light source 110 is used for offering a light beam L wherein the light source 110 is selected from one of amplified spontaneous emission (ASE) light source, laser light source or broadband light source. In this embodiment, the light source 110 is amplified spontaneous emission (ASE) light source, and the wavelength range of the light beam L is between 1520 and 1580 nm. The acousto-optic crystal optical waveguide 120 is selected from an integrated optical waveguide or a fiber optical waveguide. In this embodiment, the acousto-optic crystal optical waveguide 120 is fiber optical waveguide. The acousto-optic crystal optical waveguide 120 is used for transmitting the light beam L to the photo detector 130 used for receiving and analyzing the light beam transmitting through the acousto-optic crystal optical waveguide 120. In this embodiment, the photo detector 130 is a spectrometer.

With reference to FIG. 2, the acousto-optic crystal optical waveguide 120 includes an acousto-optic crystal core 121 and an inner cladding layer 123, wherein the material of the acousto-optic crystal core 121 is selected from one of $PbMoO_4$, $Bi_{12}GeO_{20}$ (BGO), $TeO_2$, $Tl_3AsS_4$, $Bi_{12}SiO_{20}$ (BSO), $Hg_2Cl_2$, PbBrZ, Platarsite (TAS), $Ag_3AsS_3$, Te, Ge, a-$HlO_3$, Nd:GGG, Nd:CNGG or Nd:CLTGG. In this embodiment, the diameter of the acousto-optic crystal core 121 is 5 to 100 μm, and the material of the acousto-optic crystal core 121 is $TeO_2$. Preferably, the acousto-optic crystal core 121 is manufacture by twice laser heated pedestal growth (LHPG) method, wherein an acousto-optic crystal bar of 500 μm diameter is elongated to form an acousto-optic crystal rod of about 300 μm diameter during the first LHPG method, and the acousto-optic crystal rod of about 300 μm diameter is elongated to form the acousto-optic crystal core 121 of 70 μm diameter during the second LHPG method.

Figure 3:
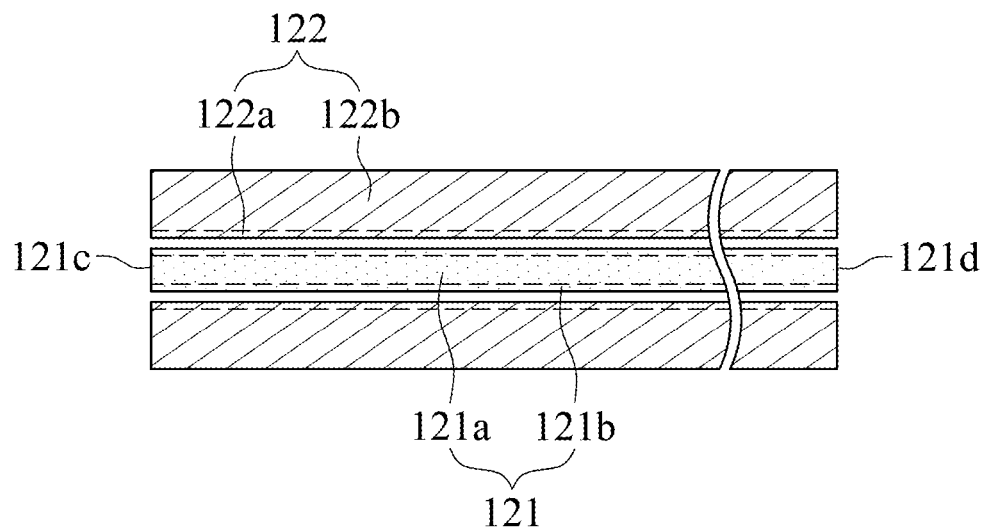
FIG. 3 is a diagram illustrating an acousto-optic crystal core and an inner cladding layer in accordance with the present invention.

With reference to FIG. 3, in this embodiment, the acousto-optic crystal core 121 is penetrated into an outer cladding layer 122 in the manufacturing process of the acousto-optic crystal optical waveguide 120, wherein the acousto-optic crystal core 121 comprises a core portion 121a and a pre-melting portion 121b located outside of the core portion 121a. The outer cladding layer 122 comprises an inner ring portion 122a and an outer ring portion 122b located outside of the inner ring portion 122a, wherein the refractive index of the outer cladding layer 122 is smaller than that of the acousto-optic crystal core 121. The material of the outer cladding layer 122 with suitable refractive index is selected from one of borosilicate glass (pyrex glass), lead glass, lead barium glass, sodium carbonate glass (soda glass), potassium carbonate glass (Potash glass), quartz glass or silica glass. In this embodiment, the outer cladding layer 122 is borosilicate glass (pyrex glass).

Figure 4:
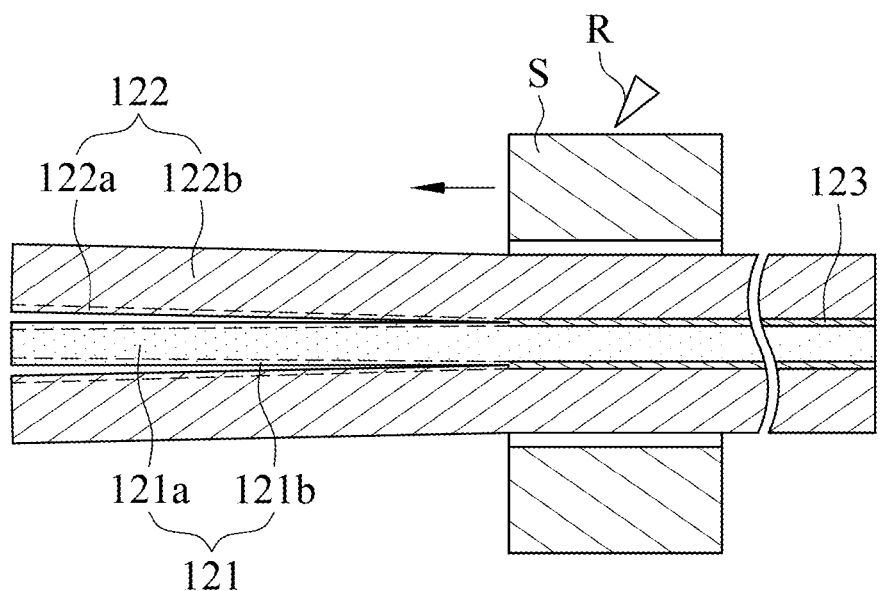
FIG. 4 is a diagram illustrating manufacturing process of the acousto-optic crystal optical waveguide in accordance with the present invention.

With reference to FIG. 4, the acousto-optic crystal core 121 penetrated into the outer cladding layer 122 is placed into a heat collecting sleeve S and a laser light R is provided to focus on the heat collecting sleeve S, wherein the laser light R makes the temperature of the heat collecting sleeve S rising between 732 and 820 degrees Celsius. In this embodiment, the heat collecting sleeve S is made of sapphire and the laser light R is $CO_2$ laser. The heat collecting sleeve S moves with a stable speed to make the acousto-optic crystal core 121 penetrated into the outer cladding layer 122 passing through the heat-collecting sleeve S.

In this embodiment, the heat collecting sleeve S heats up the acousto-optic crystal core 121 penetrated into the outer cladding layer 122 by thermal radiation when the acousto-optic crystal core 121 penetrated into the outer cladding layer 122 passes through the heat-collecting sleeve S. The pre-melting portion 121b of the acousto-optic crystal core 121 and the outer cladding layer 122 collapses between each other to form the inner cladding layer 123 by thermal radiation, wherein the inner cladding layer 123 covers the acousto-optic crystal core 121. The acousto-optic crystal optical waveguide 120 is able to be a single-cladding or multi-cladding acousto-optic crystal fiber waveguide. With reference to FIGS. 2, 3 and 4, in this embodiment, the acousto-optic crystal optical waveguide 120 is a double-cladding acousto-optic crystal fiber waveguide (the outer ring portion 122b of the outer cladding layer 122 and the inner cladding layer 123) when the inner ring portion 122a of the outer cladding layer 122 and the pre-melting portion 121b of the acousto-optic crystal core 121 collapse to form the inner cladding layer 123. In another embodiment, the acousto-optic crystal optical waveguide 120 is a multi-cladding acousto-optic crystal fiber waveguide when the double-cladding acousto-optic crystal fiber waveguide penetrates into the outer cladding layer 122 repeatedly and performs heating process by thermal radiation repeatedly, wherein the multiple outer cladding layers 122 are able to protect the acousto-optic crystal core 121. Or in another embodiment, the inner ring portion 122a of the outer cladding layer 122, the outer ring portion 122b of the outer cladding layer 122 and the pre-melting portion 121b of the acousto-optic crystal core 121 collapse to form the inner cladding layer 123 when the thickness of the outer cladding layer 122 is smaller than one half of diameter difference between the acousto-optic crystal optical waveguide 120 and the acousto-optic crystal core 121, wherein the acousto-optic crystal optical waveguide 120 is a single-cladding acousto-optic crystal fiber waveguide. Besides, the outer cladding layer 122 of double-cladding or multi-cladding acousto-optic crystal fiber waveguide also can be etched by hydrofluoric acid to form single-cladding acousto-optic crystal fiber waveguide.

With reference to FIG. 4, owing to the inner cladding layer 123 in this embodiment is formed by the inner ring portion 122a of the outer cladding layer 122 and the pre-melting portion 121b of the acousto-optic crystal core 121 collapse between each other, thus, the thickness of the inner cladding layer 123 is inversely proportional to the diameter of the acousto-optic crystal core 121. The thickness of the inner cladding layer 123 is thicker and thicker, and the diameter of the acousto-optic crystal core 121 is relatively smaller and smaller when the performing time of thermal radiation is longer and longer. The transmission mode number of the acousto-optic crystal optical waveguide 120 is less and less when the diameter of the acousto-optic crystal core 121 is smaller and smaller. Therefore, heating process of thermal radiation controls the diameter of the acousto-optic crystal core 121 and further controls the transmission mode number of the acousto-optic crystal optical waveguide 120 to make the acousto-optic crystal optical waveguide 120 of the present invention being applicable widely.

With reference to FIG. 2, the acousto-optic crystal core 121 comprises an input terminal 121c and an output terminal 121d, wherein the light beam L inputs into the input terminal 121c and outputs from the output terminal 121d. Normally, the light beam L transmits in the acousto-optic crystal core 121 in waveguide propagation modes. The refraction index of the acousto-optic crystal core 121 is higher than that of the inner cladding layer 123, and the refraction index of the inner cladding layer 123 is higher than that of the outer cladding layer 122. In this embodiment, the refraction index of the inner cladding layer 123 is 1.4 to 2.5. The inner cladding layer 123 with different refraction index is formed when the outer cladding layer 122 is made of material with different refraction index. Thus, the difference of refraction index between the acousto-optic crystal core 121 and the inner cladding layer 123 also can control the transmission mode number of the acousto-optic crystal optical waveguide 120.

Figure 5:
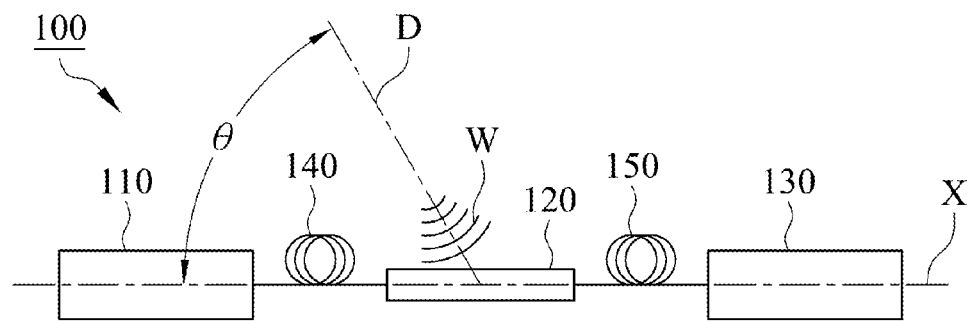
FIG. 5 is an acoustic wave detection diagram illustrating the acoustic wave sensor with acousto-optic crystal optical waveguide in accordance with first embodiment of the present invention.
Figure 6:
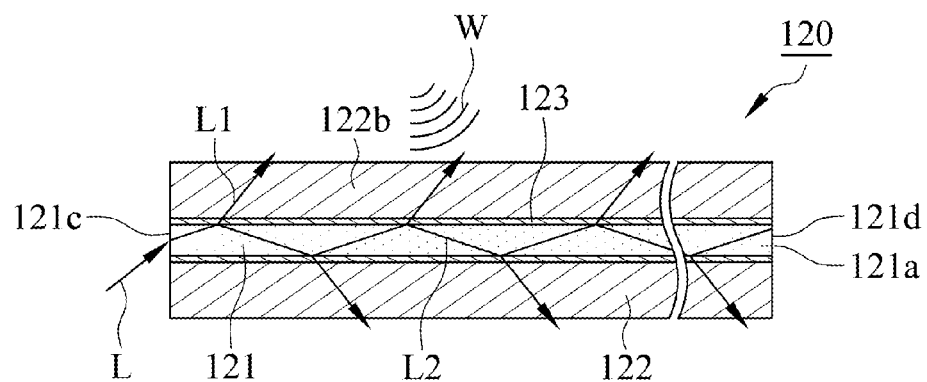
FIG. 6 is a light path diagram illustrating the acousto-optic crystal optical waveguide in accordance with the present invention.

With reference to FIGS. 5 and 6, the acousto-optic crystal density of the acousto-optic crystal core 121 produces periodic change to make the refraction index of the acousto-optic crystal core 121 produce periodic change to form a grating that makes a light beam L1 with specific wavelength unable to transmit through the acousto-optic crystal core 121 in waveguide propagation modes when the acousto-optic crystal optical waveguide 120 is affected by a continuous acoustic wave W. Referring to FIG. 6, the light beam L1 refracts to outside of the acousto-optic crystal optical waveguide 120 from the acousto-optic crystal core 121 to change spectrum of the light beam L transmitting through the acousto-optic crystal core 121 and the light beam L transforms into a light beam L2 when the light beam L transmits through the acousto-optic crystal core 121. Thereafter, the photo detector 130 receives and analyzes the light beam L2 from the output terminal 121d to analyze and determine the acoustic wave. In this embodiment, the acousto-optic crystal optical waveguide 120 is used to detect frequency and sound pressure level of the acoustic waves, wherein the acousto-optic crystal optical waveguide 1.20 enables to detect the acoustic wave with higher than 10 Hz frequency and between −236 to 70 dB sound pressure level.

Figure 7:
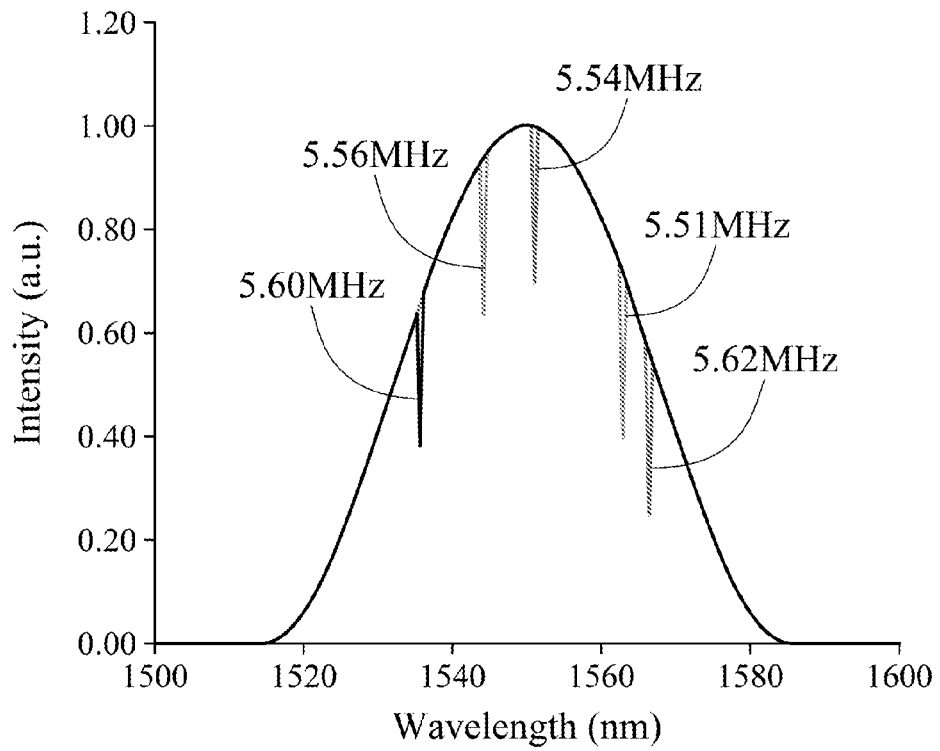
FIG. 7 is a relation diagram between optical spectrum and acoustic wave frequency illustrating the acousto-optic crystal optical waveguide in accordance with the present invention.

An acoustic wave with specific frequency causes a light beam with specific wavelength to refract to outside of the acousto-optic crystal optical waveguide 120 therefore generating intensity variation. With reference to FIG. 7 which is the relation diagram between optical spectrum and acoustic wave frequency. A 5.60 MHz acoustic wave leads a 1536 nm light beam to refract to outside of the acousto-optic crystal optical waveguide 120 and lowers the light intensity; a 5.56 MHz acoustic wave leads a 1544.5 nm light beam to refract to outside of the acousto-optic crystal optical waveguide 120 and lowers light intensity; a 5.54 MHz acoustic wave leads a 1551.5 nm light beam to refract to outside of the acousto-optic crystal optical waveguide 120 and lowers light intensity; a 5.51 MHz acoustic wave leads a 1563.5 nm light beam to refract to outside of the acousto-optic crystal optical waveguide 120 and lowers light intensity; a 5.49 MHz acoustic wave leads a 1567 nm light beam to refract to outside of the acousto-optic crystal optical waveguide 120 and lowers light intensity. Therefore, the frequency of the continuous acoustic wave W is able to be determined by light intensity variation of the specific wavelength light beam, and the sound press level of the continuous acoustic wave W is able to be determined by light intensity loss of the specific wavelength light beam.

With reference to FIGS. 1, 5 and 6, the acoustic wave sensor with acousto-optic crystal optical waveguide 100 further includes a first light-guiding device 140 and a second light-guiding device 150. The first light-guiding device 140 is disposed between the light source 110 and the acousto-optic crystal optical waveguide 120 wherein the first light-guiding device 140 is used for transmitting the light beam L from the light source 110 to the acousto-optic crystal optical waveguide 120. The second light-guiding device 150 is disposed between the acousto-optic crystal optical waveguide 120 and the photo detector 130 wherein the second light-guiding device 150 is used for transmitting the light beam L2 from the acousto-optic crystal optical waveguide 120 to the photo detector 130. In this embodiment, the first light-guiding device 140 and the second light-guiding device 150 is selected from one of single-mode fiber, multi-mode fiber or other light-guiding material.

The refractive index difference between the acousto-optic crystal core 121 and the inner cladding layer 123 or the diameter of the acousto-optic crystal core 121 is able to control the transmission mode number of the acousto-optic crystal optical waveguide 120, wherein the acousto-optic crystal optical waveguide 120 is able to be a single-mode acousto-optic crystal optical waveguide or a multi-mode acousto-optic crystal optical waveguide in the present invention. The single-mode and multi-mode acousto-optic crystal optical waveguide display difference sensitivity to acoustic angle and acoustic frequency, wherein the single-mode acousto-optic crystal optical waveguide means the transmission mode number is 1 and the multi-mode acousto-optic crystal optical waveguide means the transmission mode number is more than or equal to 2.

Figure 8:
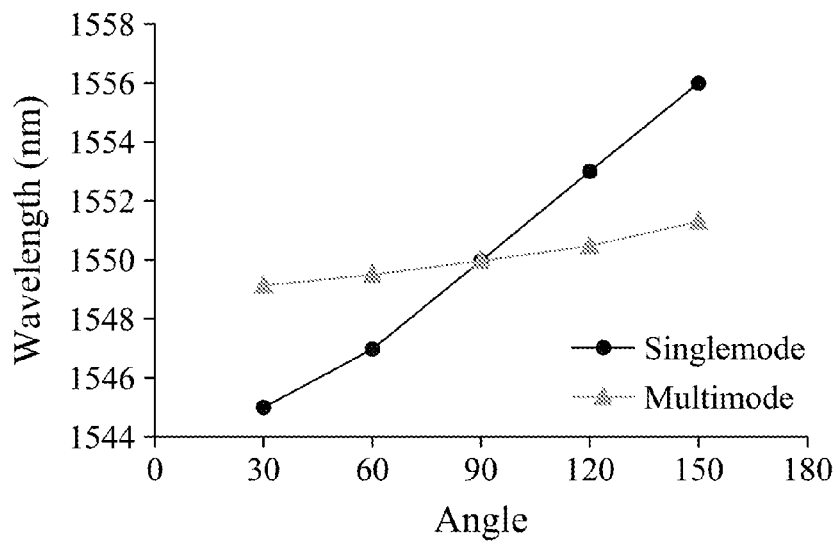
FIG. 8 is a comparison diagram of acoustic angle sensitivity illustrating a single-mode and a multi-mode acoustic-optic crystal optical waveguide in accordance with the present invention.

With reference to FIG. 8, the single-mode acousto-optic crystal optical waveguide displays greater acoustic angle sensitivity than the multi-mode acousto-optic crystal optical waveguide in the same condition because that transmission angle range of the single-mode acousto-optic crystal waveguide is narrower than that of the multi-mode acousto-optic crystal waveguide, hence the single-mode acousto-optic crystal waveguide is able to occur spectrum variation under fewer acoustic angle variation compared with the multi-mode acousto-optic crystal waveguide, wherein the acousto-optic crystal optical waveguide 120 displays 0.05-4 nm/angle acoustic angle sensitivity in single-mode and 0.01-2 nm/angle acoustic angle sensitivity in multi-mode. In this embodiment, the acoustic angle sensitivity of the acousto-optic crystal optical waveguide 120 in single-mode is 0.092 nm/angle and that of the acousto-optic crystal optical waveguide 120 in multi-mode is 0.016 nm/angle.

With reference to FIG. 5, the angle means an included angle θ between the travel directions D of the acoustic wave W and the traverse axial direction X of the acousto-optic crystal optical waveguide 120 wherein the included direction θ faces the light source 110.

Figure 9:
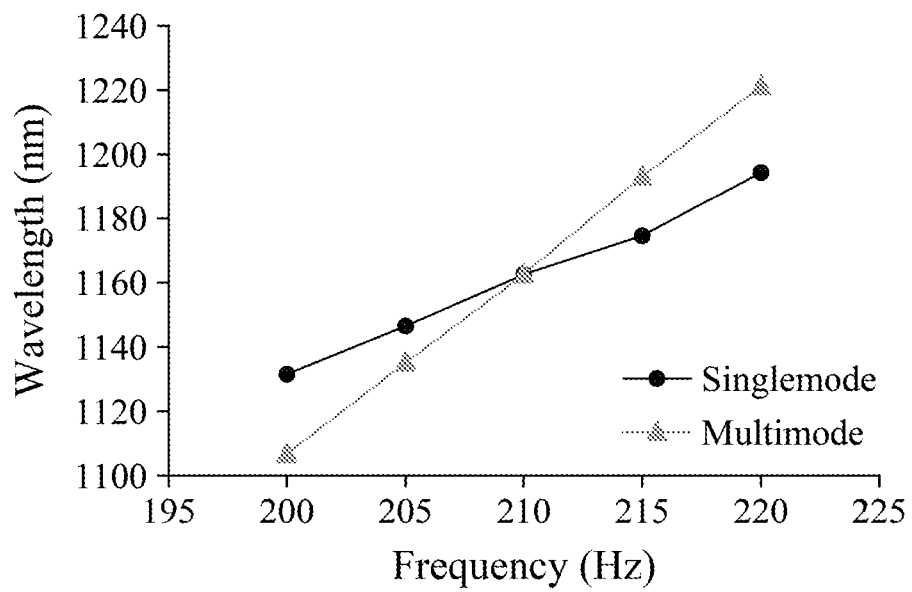
FIG. 9 is a comparison diagram of acoustic frequency sensitivity illustrating a single-mode and a multi-mode acoustic-optic crystal optical waveguide in accordance with the present invention.

With reference to FIG. 9, the multi-mode acousto-optic crystal optical waveguide displays greater acoustic frequency sensitivity than the single-mode acousto-optic crystal optical waveguide in the same condition because that multiple transmission modes of the multi-mode acousto-optic crystal optical waveguide are able to occur spectrum variation at the same time, hence the multi-mode acousto-optic crystal waveguide displays higher spectrum variation in the same condition compared with the single-mode acousto-optic crystal waveguide, wherein the acousto-optic crystal optical waveguide 120 displays 0.1-6 nm/HZ acoustic frequency sensitivity in single-mode and 0.5-10 nm/HZ acoustic frequency sensitivity in multi-mode. In this embodiment, the acoustic frequency sensitivity of the acousto-optic crystal optical waveguide 120 in single-mode is 3 nm/HZ and that of the acousto-optic crystal optical waveguide 120 in multi-mode is 5.5 nm/HZ.

Figure 10:
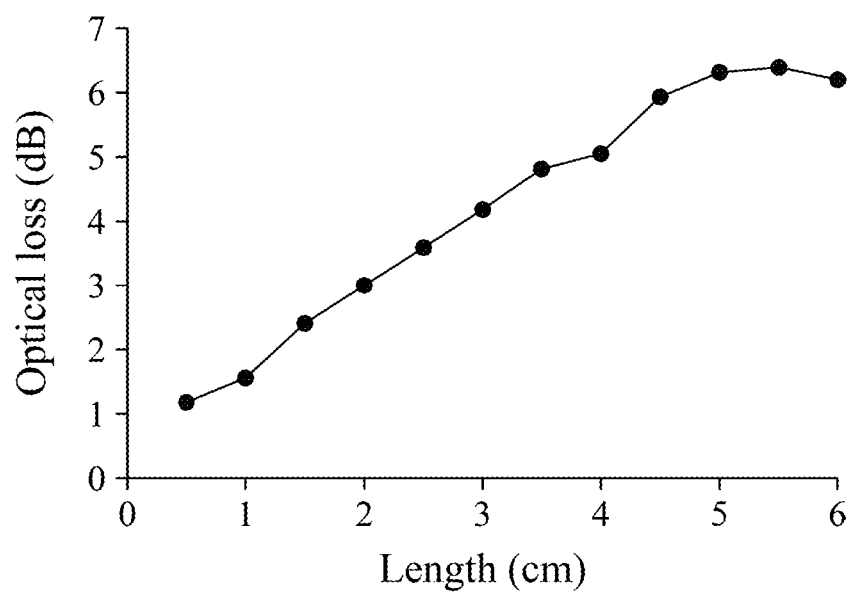
FIG. 10 is a diagram illustrating optical loss of the acousto-optic crystal optical waveguide with different length in accordance with the present invention.

With reference to FIG. 10, the acousto-optic crystal optical waveguide enables to improve acoustic wave sensing sensitivity when the acousto-optic crystal optical waveguide length is increased because of the longer acousto-optic crystal optical waveguide is able to detect wider range acoustic wave which is able to cause more optical loss. Hence the longer acousto-optic crystal optical waveguide 120 has higher acoustic wave sensing sensitivity under the same acoustic intensity, wherein the acoustic wave sensing sensitivity includes acoustic angle and acoustic frequency sensitivity. In this embodiment, the length of the acousto-optic crystal optical waveguide 120 is 0.3-20 cm.

As shown in FIG. 10, the optical loss of the acoustic wave is 1.2 dB when the length of the acousto-optic crystal optical waveguide 120 is 0.5 cm; the optical loss of the acoustic wave is 1.6 dB when the length of the acousto-optic crystal optical waveguide 120 is 1 cm; the optical loss of the acoustic wave is 3 dB when the length of the acousto-optic crystal optical waveguide 120 is 2 cm; the optical loss of the acoustic wave is 4.2 dB when the length of the acousto-optic crystal optical waveguide 120 is 3 cm; the optical loss of the acoustic wave is 5.1 dB when the length of the acousto-optic crystal optical waveguide 120 is 4 cm; the optical loss of the acoustic wave is 6.3 dB when the length of the acousto-optic crystal optical waveguide 120 is 5 cm.

Figure 11:
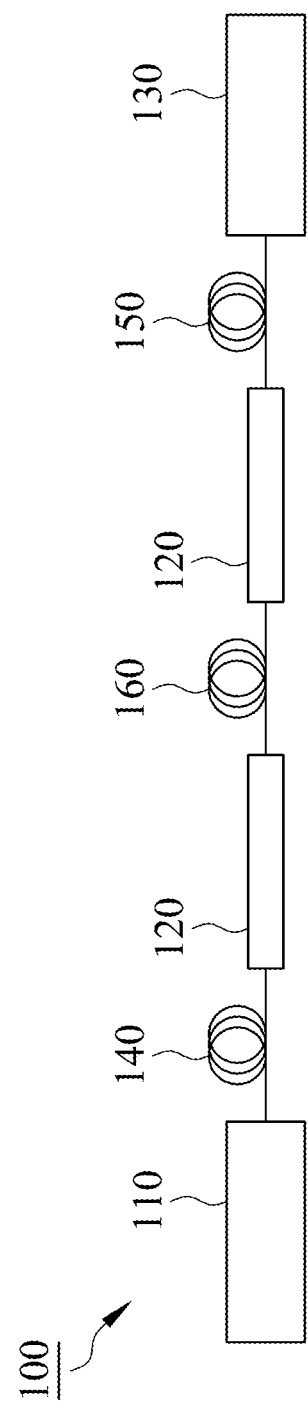
FIG. 11 is a diagram illustrating an acoustic wave sensor with acousto-optic crystal optical waveguide in accordance with second embodiment of the present invention.

A second embodiment of the present invention is illustrated in FIG. 11, the primary difference between the second embodiment and the first embodiment is that the acoustic wave sensor with acousto-optic crystal optical waveguide 100 has at least two repeat acousto-optic crystal optical waveguides 120 connect in tandem to form a acousto-optic crystal optical waveguide tandem. In this embodiment, the acousto-optic crystal optical waveguide tandem is formed by two repeat acousto-optic crystal optical waveguides 120, and the acoustic wave sensor with acousto-optic crystal optical waveguide 100 further includes a third light-guiding device 160 disposed between the two repeat acousto-optic crystal optical waveguides 120.

Figure 12:
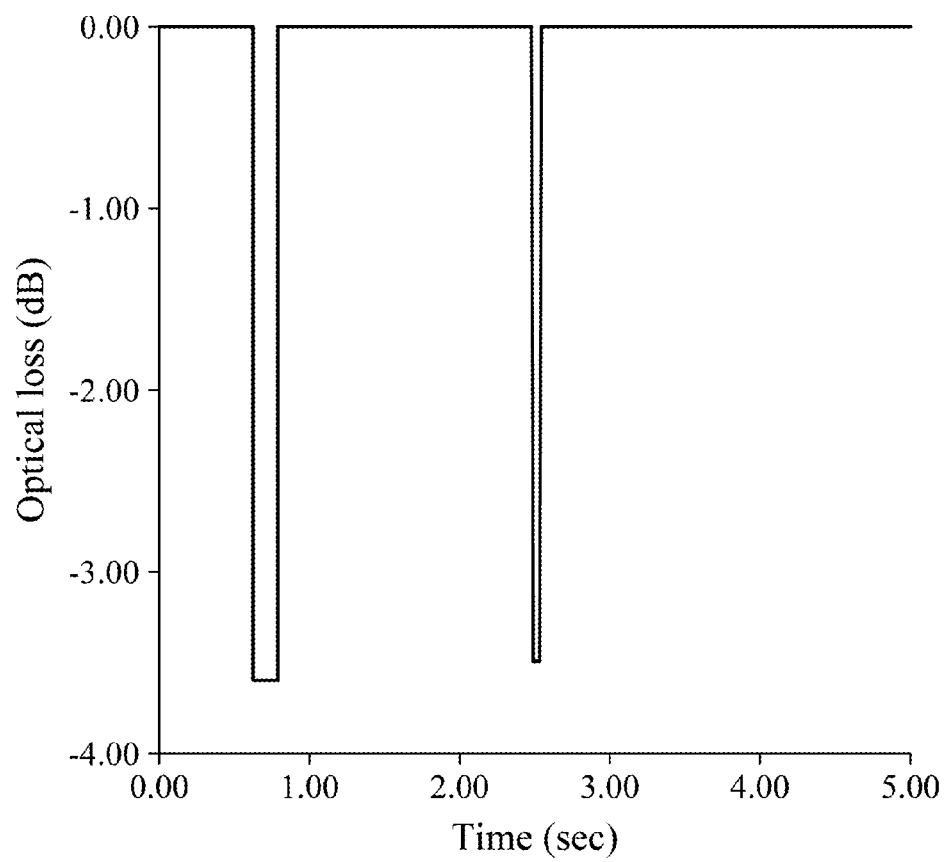
FIG. 12 is a diagram illustrating signal time difference in accordance with second embodiment of the present invention.

With reference to FIG. 12 which accordance with the second embodiment, the photo detector 130 is able to receive two signals respectively from the two repeat acousto-optic crystal optical waveguides 120 of the acousto-optic crystal optical waveguide tandem, and the acousto-optic crystal optical waveguide tandem is used to calculate source moving speed of the acoustic wave according to time difference of signal from the two repeat acousto-optic crystal optical waveguides 120. In this embodiment, the signal time difference is the time difference of the optical loss signal of the specific wavelength from the two repeat acousto-optic crystal optical waveguides 120.

Figure 13:
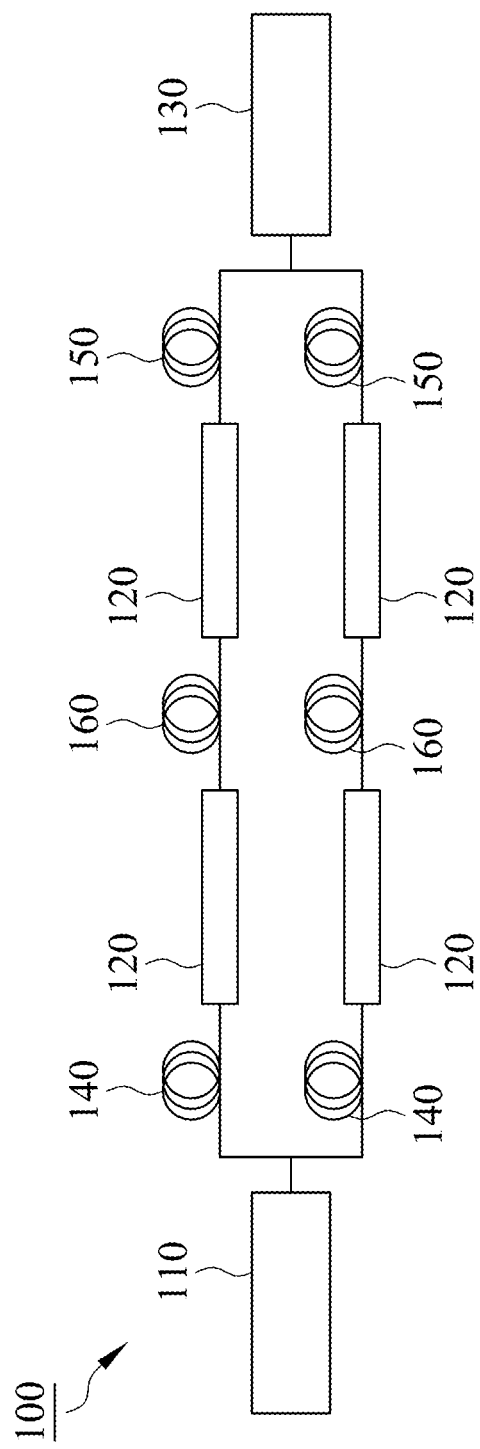
FIG. 13 is a diagram illustrating an acoustic wave sensor with acousto-optic crystal optical waveguide in accordance with third embodiment of the present invention.

A third embodiment of the present invention is illustrated in FIG. 13, the primary difference between the third embodiment and the first embodiment is that the acoustic wave sensor with acousto-optic crystal optical waveguide 100 has a plurality of acousto-optic crystal optical waveguides connect in series-parallel to form a acousto-optic crystal optical waveguide array, and the acousto-optic crystal optical waveguide array is also used to calculate source moving speed of the acoustic wave according to time difference of signal from the two repeat acousto-optic crystal optical waveguide tandems.

While this invention has been particularly illustrated and described in detail with respect to the preferred embodiments thereof, it will be clearly understood by those skilled in the art that is not limited to the specific features shown and described and various modified and changed in form and details may be made without departing from the spirit and scope of this invention.

What is claimed is:

1. An acousto-optic crystal optical waveguide used for transmitting a light beam includes:
   an acousto-optic crystal core having an input terminal and an output terminal, wherein the light beam inputs into the input terminal and outputs from the output terminal, and the light beam transmits through the acousto-optic crystal core in waveguide propagation modes; and an inner cladding layer covering the acousto-optic crystal core, wherein the acousto-optic crystal density of the acousto-optic crystal core produces periodic change to make refraction index of the acousto-optic crystal core produce periodic change to form a grating that makes a light beam with specific wavelength unable to transmit through the acousto-optic crystal core in waveguide propagation modes and refract to outside of the acousto-optic crystal optical waveguide from the acousto-optic crystal core to change spectrum of the light beam transmitting through the acousto-optic crystal core when the acousto-optic crystal optical waveguide is affected by a continuous acoustic wave.

2. The acousto-optic crystal optical waveguide in accordance with claim 1, wherein the acousto-optic crystal core further comprises a core portion and a pre-melting portion located outside of the core portion.

3. The acousto-optic crystal optical waveguide in accordance with claim 2 further includes an outer cladding layer having an inner ring portion and an outer ring portion located outside of the inner ring portion, wherein the inner ring portion and the pre-melting portion collapse to form the inner cladding layer.

4. The acousto-optic crystal optical waveguide in accordance with claim 1, wherein the material of the acousto-optic crystal core is selected from one of $PbMoO_4$, $Bi_{12}GeO_{20}$ (BGO), $TeO_2$, $Tl_3AsS_4$, $Bi_{12}SiO_{20}$ (BSO), $Hg_2Cl_2$, PbBrZ, Platarsite (TAS), $Ag_3AsS_3$, Te, Ge, a-$HlO_3$, Nd:GGG, Nd:CNGG or Nd:CLTGG.

5. The acousto-optic crystal optical waveguide in accordance with claim 3, wherein the material of the outer cladding layer with suitable refractive index is selected from one of borosilicate glass, lead glass, lead barium glass, sodium carbonate glass, potassium carbonate glass, quartz glass or silica glass.

6. The acousto-optic crystal optical waveguide in accordance with claim 1 is used to detect frequency of acoustic waves.

7. The acousto-optic crystal optical waveguide in accordance with claim 1 is used to detect sound pressure level of acoustic waves.

8. The acousto-optic crystal optical waveguide in accordance with claim 1 is a single-mode acousto-optic crystal optical waveguide with 0.05-4 nm/angle acoustic angle sensitivity.

9. The acousto-optic crystal optical waveguide in accordance with claim 1 is a multi-mode acousto-optic crystal optical waveguide with 0.01-2 nm/angle acoustic angle sensitivity.

10. The acousto-optic crystal optical waveguide in accordance with claim 1 is a single-mode acousto-optic crystal optical waveguide with 0.1-6 nm/Hz acoustic frequency sensitivity.

11. The acousto-optic crystal optical waveguide in accordance with claim 1 is a multi-mode acousto-optic crystal optical waveguide with 0.5-10 nm/Hz acoustic frequency sensitivity.

12. The acousto-optic crystal optical waveguide in accordance with claim 1, wherein the length of the acousto-optic crystal optical waveguide is 0.3-20 cm.

13. An acoustic wave sensor with acousto-optic crystal optical waveguide includes:
a light source used for offering a light beam;
at least one acousto-optic crystal optical waveguide including an acousto-optic crystal core and an inner cladding layer covers the acousto-optic crystal core, wherein the acousto-optic crystal core comprises an input terminal and an output terminal, the light beam inputs into the input terminal and outputs from the output terminal, the light beam transmits through the acousto-optic crystal core in waveguide propagation modes, the acousto-optic crystal density of the acousto-optic crystal core produces periodic change to make refraction index of the acousto-optic crystal core produce periodic change to form a grating that makes a light beam with specific wavelength unable to transmit through the acousto-optic crystal core in waveguide propagation modes and refract to outside of the acousto-optic crystal optical waveguide from the acousto-optic crystal core to change spectrum of the light beam transmitting through the acousto-optic crystal core when the acousto-optic crystal optical waveguide is affected by a continuous acoustic wave; and
a photo detector receiving the light beam transmitted from the output terminal, wherein the photo detector is used for analyzing the light beam transmitting through the acousto-optic crystal optical waveguide.

14. The acoustic wave sensor with acousto-optic crystal optical waveguide in accordance with claim 13, wherein the acousto-optic crystal core further comprises a core portion and a pre-melting portion located outside of the core portion.

15. The acoustic wave sensor with acousto-optic crystal optical waveguide in accordance with claim 14, wherein the acousto-optic crystal optical waveguide further includes an outer cladding layer, the outer cladding layer has an inner ring portion and an outer ring portion located outside of the inner ring portion, and the inner ring portion and the pre-melting portion collapse to form the inner cladding layer.

16. The acoustic wave sensor with acousto-optic crystal optical waveguide in accordance with claim 13, wherein the material of the acousto-optic crystal core is selected from one of $PbMoO_4$, $Bi_{12}GeO_{20}$ (BGO), $TeO_2$, $Tl_3AsS_4$, $Bi_{12}SiO_{20}$ (BSO), $Hg_2Cl_2$, PbBrZ, Platarsite (TAS), $Ag_3AsS_3$, Te, Ge, a-$HlO_3$, Nd:GGG, Nd:CNGG or Nd:CLTGG.

17. The acoustic wave sensor with acousto-optic crystal optical waveguide in accordance with claim 15, wherein the material of the outer cladding layer with suitable refractive index is selected from one of borosilicate glass, lead glass, lead barium glass, sodium carbonate glass, potassium carbonate glass, quartz glass or silica glass.

18. The acoustic wave sensor with acousto-optic crystal optical waveguide in accordance with claim 13, wherein the light source is selected from one of amplified spontaneous emission (ASE) light source, laser light source or broadband light source.

19. The acoustic wave sensor with acousto-optic crystal optical waveguide in accordance with claim 13, wherein the acousto-optic crystal optical waveguide is used to detect frequency of acoustic waves.

20. The acoustic wave sensor with acousto-optic crystal optical waveguide in accordance with claim 13, wherein the acousto-optic crystal optical waveguide is used to detect sound pressure level of the acoustic waves.

21. The acoustic wave sensor with acousto-optic crystal optical waveguide in accordance with claim 13, wherein the acousto-optic crystal optical waveguide is a single-mode acousto-optic crystal optical waveguide with 0.05-4 nm/angle acoustic angle sensitivity.

22. The acoustic wave sensor with acousto-optic crystal optical waveguide in accordance with claim 13, wherein the acousto-optic crystal optical waveguide is a multi-mode acousto-optic crystal optical waveguide with 0.01-2 nm/angle acoustic angle sensitivity.

23. The acoustic wave sensor with acousto-optic crystal optical waveguide in accordance with claim 13, wherein the acousto-optic crystal optical waveguide is a single-mode acousto-optic crystal optical waveguide with 0.1-6 nm/Hz acoustic frequency sensitivity.

24. The acoustic wave sensor with acousto-optic crystal optical waveguide in accordance with claim 13, wherein the acousto-optic crystal optical waveguide is a multi-mode acousto-optic crystal optical waveguide with 0.5-10 nm/Hz acoustic frequency sensitivity.

25. The acoustic wave sensor with acousto-optic crystal optical waveguide in accordance with claim 13, wherein the length of the acousto-optic crystal optical waveguide is 0.3-20 cm.

26. The acoustic wave sensor with acousto-optic crystal optical waveguide in accordance with claim 13, wherein at least two repeat acousto-optic crystal optical waveguides connect in tandem to form an acousto-optic crystal optical waveguide tandem.

27. The acoustic wave sensor with acousto-optic crystal optical waveguide in accordance with claim 26, wherein the acousto-optic crystal optical waveguide tandem is used to calculate source moving speed of the acoustic wave.

28. The acoustic wave sensor with acousto-optic crystal optical waveguide in accordance with claim 13, wherein a plurality of acousto-optic crystal optical waveguides connect in series-parallel to form an acousto-optic crystal optical waveguide array.

29. The acoustic wave sensor with acousto-optic crystal optical waveguide in accordance with claim 28, wherein the acousto-optic crystal optical waveguide array is used to calculate source moving speed of the acoustic wave.

* * * * *